(12) United States Patent
Jacobson

(10) Patent No.: US 6,398,992 B1
(45) Date of Patent: Jun. 4, 2002

(54) USE OF STATE-CHANGE MATERIALS IN REFORMABLE SHAPES TEMPLATES OR TOOLING

(76) Inventor: Theodore L. Jacobson, 605 Forest Lake, Pacifica, CA (US) 94044

( * ) Notice: Subject to any disclaimer, the term of this patent is extended or adjusted under 35 U.S.C. 154(b) by 0 days.

(21) Appl. No.: 09/478,956

(22) Filed: Jan. 7, 2000

Related U.S. Application Data

(60) Provisional application No. 60/115,472, filed on Jan. 11, 1999.

(51) Int. Cl.[7] .............................................. B29C 33/40
(52) U.S. Cl. ........................ 264/37.1; 264/108; 264/220
(58) Field of Search ................................. 264/225, 220, 264/219, 221, 226, 227, 108, 109, 86, 37.1, 37.18, 206; 164/1, 6, 15, 37, 520; 249/117, 155, 156; 425/84, 85; 297/452.41

(56) References Cited

U.S. PATENT DOCUMENTS

| | | | | |
|---|---|---|---|---|
| 2,517,902 A | * | 8/1950 | Luebkeman | 264/225 |
| 3,136,831 A | * | 6/1964 | Zinn | 264/225 |
| 3,608,961 A | * | 9/1971 | Von Heck | 297/284 |
| 3,962,395 A | * | 6/1976 | Hagglund | 264/91 |
| 4,126,659 A | | 11/1978 | Blad | 264/90 |
| 4,327,046 A | * | 4/1982 | Davis et al. | 264/102 |
| 4,885,811 A | * | 12/1989 | Hayes | 5/82 R |
| 4,931,241 A | * | 6/1990 | Freitag | 264/86 |
| 4,952,190 A | * | 8/1990 | Tarnoff et al. | 446/267 |
| 5,093,138 A | * | 3/1992 | Drew et al. | 426/68 |
| 5,094,875 A | * | 3/1992 | Chen | 426/634 |
| 5,198,167 A | * | 3/1993 | Ohta et al. | 264/86 |
| 5,262,121 A | | 11/1993 | Goodno | 264/571 |
| 5,348,070 A | * | 9/1994 | Fischer et al. | 164/38 |
| 5,374,388 A | | 12/1994 | Frailey | 264/510 |
| 5,556,169 A | * | 9/1996 | Parrish et al. | 297/452.28 |
| 5,626,657 A | * | 5/1997 | Pearce | 106/122 |
| 5,881,409 A | * | 3/1999 | Pearce | 5/702 |
| 5,928,597 A | * | 7/1999 | Van Ert | 264/316 |
| 5,957,189 A | * | 9/1999 | Uzaki et al. | 164/7.1 |
| 5,966,763 A | * | 10/1999 | Thomas et al. | 5/715 |
| 5,971,742 A | * | 10/1999 | McCollum et al. | 425/542 |
| 6,224,808 B1 | | 5/2001 | Essinger et al. | 264/221 |

* cited by examiner

Primary Examiner—M. Alexandra Elve
Assistant Examiner—Kevin P. Kerns
(74) Attorney, Agent, or Firm—Townsend and Townsend and Crew LLP

(57) ABSTRACT

A method, process and apparatus for generating a stable, force-resisting positive or negative representation of a shape. A state-changeable mixture includes uniform, generally ordered, closely-spaced solid bodies and a liquid carrier medium of relatively similar density, with the liquid medium filling any voids or interstices between the bodies and excluding air or gas bubbles from the mixture. Within the mixture, the solid bodies can be caused to transition from a near-liquid or fluent condition of mobility to a stable, force-resisting condition through introduction and then extraction of a slight excess quantity of the carrier medium. To create mobility, this excess quantity or transition liquid is introduced to create a fluent condition by providing a slight clearance between the bodies which permits the gently-forced introduction of at least two simultaneous slip planes between ordered bulk masses of the bodies at any point in the mixture. Transition to the stable condition is caused by extraction of the transition liquid, removing the clearance between bodies and causing them to make stable, consolidated contact.

22 Claims, 6 Drawing Sheets

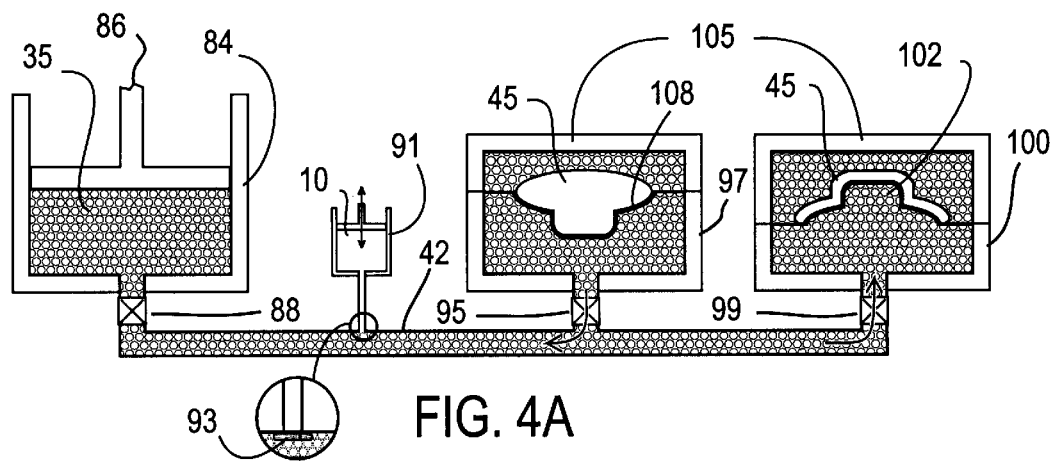
FIG. 4A
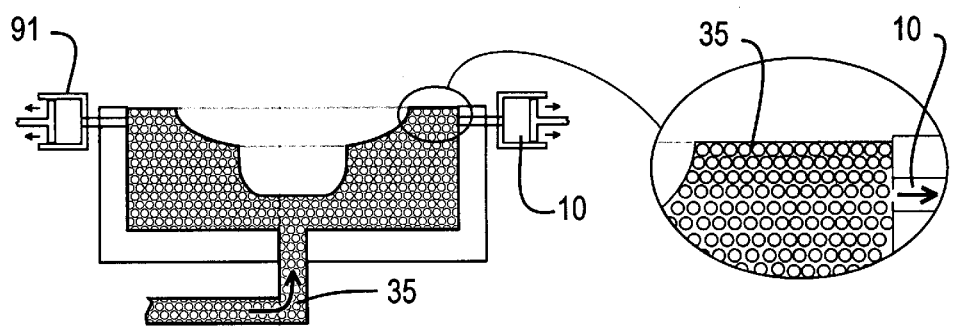
FIG. 4B
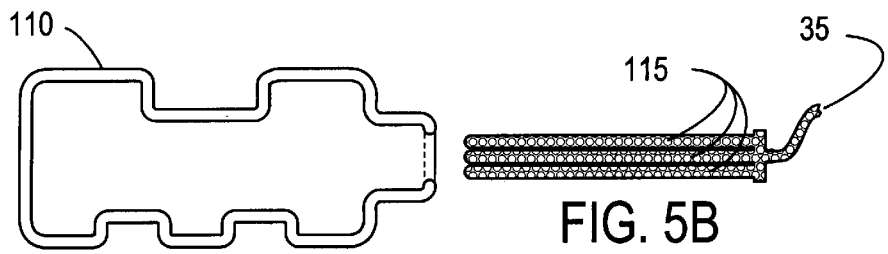
FIG. 5A
FIG. 5B
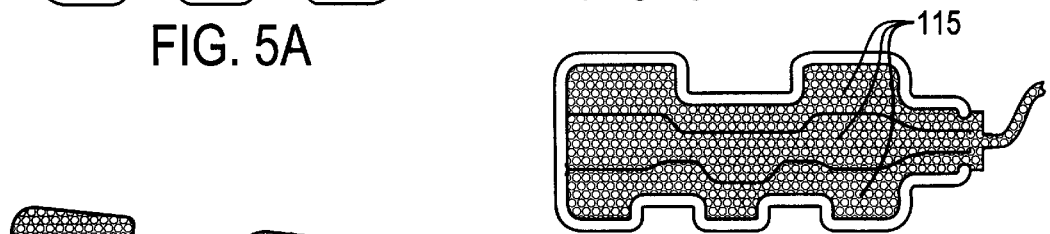
FIG. 5C
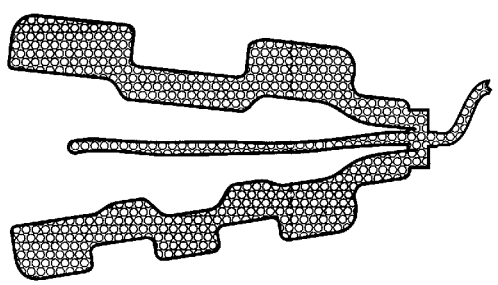
FIG. 5D
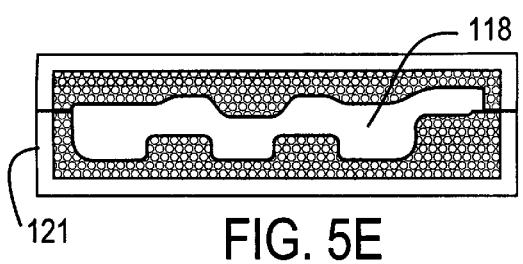
FIG. 5E

USE OF STATE-CHANGE MATERIALS IN REFORMABLE SHAPES TEMPLATES OR TOOLING

CROSS-REFERENCE TO RELATED APPLICATION

This application claims priority from U.S. patent application No. Ser. 60/115,472, filed Jan. 11, 1999, titled "Generation of Stable Near-Net Shapes from Confined, Mobile, Lockable Particle Masses (The Use of State-Change Mediums in Reformable shapes, Templates or Tooling)," the entire disclosure of which (including all attached documents) is incorporated by reference in its entirety for all purposes.

BACKGROUND OF THE INVENTION

The prior art for making molds or tooling deals for the most part with fabricating, machining, layered deposition forming, molding or casting of tools for a single dedicated purpose. While the tools may be modified or the materials recycled, often this is accomplished only with multiple steps and at considerable expense. Specific instances of quickly reformable molds have been found which rely on beads, sand or other particulate materials being blown or poured into a container with at least one flexible or elastically extensible surface. An article is pushed against or surrounded by the flexible surface and the contained particulate material, and then a vacuum is pulled on the container to remove air so that ambient air pressure consolidates the beads or particles and holds the flexible surface against them in the shape of the article. Likewise, numerous instances have been found of cushions, pads or seats which rely on introducing or vacuuming air from a bead-filled, flexible or stretchable sealed envelope, while other instances have been found of reformable shapes comprising flexible envelopes which contain mixtures of beads or microspheres combined with binding yet flowable lubricants or highly viscous materials. Some of these shapes have been made temperature responsive, so that heat would soften them and cooling would harden them.

Mass Production Casting or Molding

U.S. Pat. No. 5,348,070 (Fischer et al.) is titled "Process for the Compression of Molding Sand for Casting Molds," and discloses a method for closely packing sand into a mold through a process of fluidizing it within the mold by a surge of compressed air through the sand and then compressing it by mechanical pressing. The technique requires a pressure rise and a pressure reduction gradient in the fluidizing process and requires initiating the mechanical pressing operation during the controlled pressure reduction. This multi-step process allows the sand grains to be jostled into any voids which could form as a result of particles being allowed to statically press on one another.

U.S. Pat. No. 5,957,189 (Uzaki et al.) describes an "apparatus and method for sequentially feeding quantities of sand into a mold space and subjecting the space to evacuation and then pressure increase after each feed." The process differs from Fischer in that layers of sand are placed in the mold and consolidated by evacuation of air followed by rapid pressurization or pulse of compressed air, thus avoiding the need for a mechanical tool to press the sand. As with Fischer the pressure uses a considerable amount of compressed air and also requires a vacuum source.

U.S. Pat. No. 5,971,742 (McCollum) is titled "Apparatus for Molding Composite Articles" and describes liquid-supported thin-shell molds. These rapid molds utilize a thin shell or shaped "membrane" which is stabilized or forced against formable material by a backing liquid. The technique requires a separate forming or fabrication step to create the formed shell or membrane.

U.S. Pat. No. 5,928,597 (Van Ert et al.) is titled "Method for Thermoforming Sheet Articles" and discloses a method of thermoforming shapes from sheet materials which also utilizes thin shells which are forced against the sheet by a pressurized liquid which also cools the sheet. Again, as with McCollum, the technique requires that specific-use shells be formed as the mold faces. In addition it is not clear that there is a mechanism other than the stiffness of the thin formed shells to prevent distortion of the molded shape by the generally non-uniform resistance of a sheet undergoing thermoforming.

Custom Casting or Molding

U.S. Pat. No. 3,962,395 (Hägglund) is titled "Method of Producing Castings or Other Mouldings by Means of Vacuum Suction of Flexible Containers Holding Granular Material." The technique utilizes granular material poured into a container to push against a flexible "wall" of the container comprising an elastic sheet or formed plastic film, which in turn is forced against a shape such as the stump of an amputee's limb. Air is then evacuated or partially evacuated "to cause the granules to form a solid, persistent mass conforming to the shape of the model" which is then removed from contact with the stabilized surface. Hägglund, while interested in a certain degree of accurate conformity to the model, is not concerned, as are Fischer and Uzaki, with a high degree of consolidation of the particulate material without voids.

U.S. Pat. No. 4,327,046 (Davis et al.) is titled "Method for Producing a Rigid, Shaped Mass Support System" and describes a flexible container (envelope) of elastic film filled with a mixture of rigid particles and a curable adhesive binder material. The envelope is molded to fit a contour such as a particular portion of a person's body, and then the envelope is "evacuated to remove volatiles and fix the shape of the contents of the container," following which the binder is cured to solidify the mixture. Then "the polymeric film can be stripped away, after which an adhesive paint is applied to seal and protect the surface." Again as with Hägglund, the object is not to furnish precise, complex-shape conformability, but rather to follow relatively gentle contours. Also the process again requires a vacuum source to stabilize the molded form.

Reformable Objects—Seats, Toys, Cushions, Protective Pads etc

U.S. Pat. No. 3,608,961 (Von Heck) is titled "Variable Contour Cushion" and discloses the application of vacuum to press together and stabilize an air-tight envelope partially filled with bead-like materials. There is no attempt to create a precise fit to complex contours or to minimize the quantity of fluid that is introduced and removed from the envelope.

U.S. Pat. No. 4,885,811 (Hayes) is titled "Protecting Bodies During Transit" and shows a restraint consisting of soft, flexible bubbles encased in an air-tight film envelope. The bubbles are soft, having a Shore A Durometer rating of 10 or less. When air is withdrawn from the envelope the restraint molds to the shape of an object which it surrounds, becoming stable while remaining soft and pliable. Again the transfer of air into and out of an envelope is shown, though with the contained bodies being quite resilient when compressed together by ambient pressure. Likewise, there is no attempt to strive for a precise fit to the surrounded body nor to limit quantity of air in and out of the envelope.

U.S. Pat. No. 4,952,190 (Tarnoff et al.) is titled "Deformable Article" and discloses a novelty toy consisting of a flexible shaped bladder with a sealable filling stem which is filled with a moldable filling medium such as a cohesive mixture of hollow or solid microspheres and water. The intent is to product a light, deformable object which can be thrown or caught at significant speed without damaging the objects it hits or a catcher's hand. There is no intent to control the properties of the mixture beyond furnishing this impact-absorbing deformability.

U.S. Pat. No. 5,093,138 (Drew et al.) shows a flowable, pressure-compensating material which consists of a mixture, composition or medium of spherical bodies in a liquid, though with glycerin or some other additive to increase the viscosity of the composition. It is intended for use in padding devices and is one of several similar media with varying degrees of resistance to flow. There is no provision for varying the flowability or resistance to motion within a single material formulation.

U.S. Pat. No. 5,556,169 (Parrish et al.) is titled "Multi-Layer Conformable Support System" and describes an outer fluid-sealed layer containing beads which are movable relative to one another when a fluid such as air is introduced, and which are inhibited from motion by atmospheric pressure when the fluid is evacuated. A second fluid-sealed layer underlays the first layer, and air is introduced into it, pushing on the first bead-containing layer and molding it against a shape pressed into the first layer. The technique does not transfer the beads or beadlike structures into and out of the first or any of the layers, which action could achieve the same adjustable conforming effect with a single layer rather than with the multiple coupled layers or compartments shown.

U.S. Pat. No. 5,881,409 (Pearce) is titled "Puff-Quilted Bladders for Containing Flowable Cushioning Medium." The bladders are sealed in a quilted pattern to a base fabric so as to have loose surface skin with many random folds and creases. The cushioning medium is preferred to be lightly lubricated microspheres which the inventor describes in a related U.S. Pat. No. 5,626,657 as being hollow microspheres coated with a lubricant in just sufficient quantity to facilitate sliding and rolling movement between microspheres without physical separation. The desired properties are low specific gravity, low thermal mass, low coefficient of heat transfer, lack of head pressure, insulative and flotation qualities. The system achieves conformability and cushioning through partial fill and limited displacement within the puff-quilted areas.

U.S. Pat. No. 5,966,763 (Thomas et al.) is titled "Surface Pad System for a Surgical Table" and is a more complex version of Parrish's system due to its application requiring active heating and cooling as well as conforming to portions of a body and restricting movement. The compressible bead-containing "bag" has two layers of multiple elements which can be evacuated and there is an underlying inflatable bladder to conform it to a body region prior to stabilizing it. There are also additional layers of heating and cushioning pads.

SUMMARY OF THE INVENTION

The present invention provides quickly reversible state-change mixtures which can be rapidly shifted from a near-liquid or fluent state to a stable force-resisting state through slightly altering the liquid-solid proportions, and the invention further provides methods and apparatus for utilizing the mixtures. Embodiments are characterized by one or more of the following advantages: the ability to pressurize a mixture and drive it against a complex surface as if it were a liquid; the ability to create a "near-net" or extremely accurate representation of a shape due to the negligible volumetric change which accompanies a state change; the ability to effect the state-change with a very small volume of single-constituent transfer and with consequently small actuation devices, with a low-energy mechanical actuation, and without requiring a vacuum pump, thermal, chemical or electrical energy to be applied to the mixture; the ability to greatly alter the volume of any elastic or otherwise dimensionally changeable container, envelope or chamber through the free-flowing transfer of the nearly solid mixtures from one container to another; and the ability to tailor the mixtures to satisfy a wide variety of physical specifications in either the flowable or the stable state.

The mixtures can be employed in reformable molds or other shaping tools, and in reusable templates which capture the dimensions of impressed shapes for transfer to a mold. The mixtures can also be used in any product or shape which benefits from the incorporation of arbitrarily reformability or precise reconfigurability. The mixtures further provide useful properties for but are not limited to application in a wide range of shock-absorbing, leveling, protective and supportive apparatus.

In brief, the present invention provides a state-changeable mixture comprising a plurality of solid bodies and a liquid carrier medium of relatively similar density, with the liquid medium filling any voids or interstices between the bodies, preferably excluding air or gas bubbles from the mixture. Within the mixture, the solid bodies can be caused to transition from a formable stage, preferably a near-liquid or fluent condition of mobility, to a stable, force-resisting condition through introduction and then extraction of a slight excess quantity of the carrier medium.

In embodiments, the solid bodies are uniform, generally ordered, and closely-spaced, and to create mobility, the excess amount of liquid (hereinafter called the transition liquid) is introduced in just-sufficient quantity to create a fluent condition by providing a predetermined clearance between the bodies, which clearance permits the gently-forced introduction of at least two simultaneous slip-planes between geometrically ordered bulk masses of the bodies at any point in the mixture.

A surface of the mixture in the formable state, is first made to conform to a desired shape. The bodies in the mixture can then be caused to transition from the fluent condition to the stable condition through extraction of the transition liquid, with the extraction removing the clearance required to provide at least two gently-forced slip-planes between ordered masses of the solid bodies, thereby causing the bodies to make nested, packed, interlocking or otherwise stable consolidated contact. The mixture, in the stable state, now has a surface that conforms to the desired shape.

The invention also provides a method for employing the mixtures in molds, templates or other products of use through holding the mixtures in, or transferring quantities of the mixtures, while in the fluent condition, into and out of variable-contour or variable-volume containers or chambers. The mixtures can be stabilized by removal of the transition liquid, which causes an elastic membrane to be pushed against the consolidated bodies by ambient pressure or which causes the solid bodies to pack together to create an ordered, force-resisting structure through adhesion to one another.

Transfer of fluent mixtures into and out of the containers, or displacement of mixtures within the containers, can be accomplished by pressure forces within the mixture, with these forces being distributed uniformly throughout the mixture by the liquid carrier medium. The pressure forces can be exerted through pressing a shape against an elastic, stretchable membrane which constitutes at least one surface of a chamber substantially filled with the fluent mixture, or the forces within the liquid medium of the fluent mixture can be induced by a reversible fluent-mixture transfer system. There are also various methods of displacing fluent mixtures within variable-volume elastic envelopes by pressing the fluent mixture-filled envelopes against shapes, which pressurizes the carrier medium and causes the envelopes to extend and conform to the shapes as the contained fluent mixtures flow within the envelopes. As previously described, the mixtures are then stabilized by extraction of the transition liquid, creating force-resisting negatives of the original shapes as defined by outer surfaces of the elastic-membrane envelopes or the consolidated surface of the mixture.

Embodiments include further methods of creating a sculptable state in specific state-change mixtures through placing the mixtures in a quasi-stable condition. the solid bodies are held in contact by extraction of a portion of the transition liquid, yet have sufficient lubricity or low contact friction to be displaced relative to one another by externally imposed forces. The bodies can be displaced into voids created within a mass of the quasi-consolidated mixture, or can be progressively displaced along the surface of the medium from one region of the mass to another.

Another state-change mixture utilizes solid bodies as previously described along with a state-changeable liquid carrier medium. The method of changing the mixture from fluent to stable and back again is, as described above, through transfer of a small amount of excess liquid; however, the mixture can be further solidified by changing the state of the carrier medium from liquid to solid.

In yet another embodiment, a state-change mixture is consolidated within a mold chamber and the liquid carrier or a second liquid component is circulated while held to a pressure below ambient. Through heating and cooling of the circulating liquid, the mold itself can be heated or cooled.

Still another embodiment of the state-change mixture has solid bodies which are hollow and very light, and a carrier medium consisting of a liquid-gas froth of similar density. The froth is destroyed when extracted since the gas within it expands and separates from the liquid component; then the froth is reconstituted from the liquid and and reintroduced into the body mass to recreate a fluent mixture. The liquid component of the froth may be a solvatable (solvent-releasable) adhesive which be dried to hold the consolidated bodies together and then re-dissolved by the frothed carrier medium. Very light bodies can also be surrounded by a denser liquid, with the mixture likewise becoming fluent and then stabilized with transfer of a small quantity of transition liquid; however, the tendency of the bodies to adhere together under contact pressure is preferably countered, or liquid-like transfer of the mixture, especially through small lines or passages, becomes difficult if not impossible.

To reiterate, according to embodiments of the invention, the state-change within the mixtures is effected by the transfer of a small amount of excess carrier medium, the transition liquid, into and out of the mixtures. When the transition liquid is present, preferably in just-sufficient quantity to create the degree of support and clearance which provides for at least two slip-planes, the solid bodies have a degree of mobility similar to that of the liquid medium of the mixture. The slip-plane condition can be generated through very small liquid pressure differential or through externally imposed forces which displace the carrier liquid and the supported bodies along with the liquid. Ordered bulk masses of the bodies can shift relative to other ordered masses at any point within a continuous volume of the mixture, and the location of the slip-planes can fluidly shift under any slight differential force transferred from one body to another. It is preferred to prevent frictional contact between bodies during such force transfer by having the liquid medium of the mixture furnish viscous resistance to contact and a light degree of body-surface lubrication.

Lubricity under high contact forces, as is required for many lubricating mediums, is not necessary within the mixtures since the bodies are in effect free-floating during flow, with any imposed liquid pressure forces being uniformly distributed against the surface of each body. For example a nearly ideal aqueous liquid medium can be formed by dissolving a small quantity of a soluble long-chain polymer such as polyethylene oxide into water. The medium carries solid bodies of a similar density without turbulence and friction-producing contact, allows the bodies to make nonlubricated surface contact when the medium is extracted, and causes the bodies to readily separate when the transition liquid is reintroduced.

When the transition liquid is extracted so that the solid bodies are in a stable configuration with ordered, packed and consolidated contact, the degree of resistance to externally imposed forces depends on such tailorable, engineered physical properties as body shape, body elasticity and compressibility, body surface properties of roughness, smoothness or natural molecular adhesion, residual adhesiveness or lubricity of the liquid medium on the contacting surfaces, surface tension of the medium, and variations of liquid medium or body properties with changes of temperature or pressure; alteration of the resistance properties through replacement of the first liquid with a second liquid medium, rinsing of the bodies and the first medium with a second or sequential liquid mediums, vapors or gaseous fluids; and any other engineered variations in the bodies and first liquid medium, and in other sequential introductions of various fluids into the mixtures or through the consolidated bodies. Any adhesive or clinging contact between the bodies is relieved through polar molecular action of the first liquid medium, or through an intermediary treatment with other liquids or fluids prior to reintroduction of the first liquid medium.

Certain preferred embodiments of the invention provide for holding the mixture inside a container or transporting the mixture into a container with at least one flexible, elastically deformable and stretchable wall; and extracting the transition liquid from the mixture so as to cause body-to-body contact and force-resisting stability through pressure external to the container acting on the confined, ordered, abutting bodies. In some embodiments, properties of flow of the mixture and the resistance to deformation of the abutted bodies are predetermined so as to be a function of the imposed external forces, and so to be subject to variable control which allows intermediate quasi-stable, sculptable or displaceable conditions within or on the surface of the bulk mixture. Finally, the degree of accuracy or irregularity on the surface of a stabilized mass of the mixture is dependent on the relationship between the fineness of the dimensions to be captured, a covering membrane's thickness and conformability, and the size and degree of regular packing order of a state-change mixture's solid bodies.

Uniform solid bodies with other than spherical geometries can be usefully employed. For instance, hard flake-like bodies can be employed, in which case the flat faces of the bodies can be pressed against one another to create a force-resisting body mass. The flat faces provide many times the surface area contact of abutting spheres, with accordingly higher friction or adhesion potential. If the flakes consist of a laminate which has one side heavier than the carrier medium and one side lighter, and if the flakes are again closely spaced and in a medium which suppresses turbulence and solid body tumbling, the bodies will tend to be supported in, and be consolidated in, an ordered parallel configuration. In this case, as with the spherical bodies, the transition liquid quantity will be just sufficient to create shear motion of body masses under low displacement forces. Finally, if these or any other bodies are very small compared to the container volume and the contours of a shape which is to be replicated, the mobile solid will assume a near-net shape relative to its container and any impressed shape when the tiny proportion of transition liquid is removed.

A further understanding of the nature and advantages of the present invention may be realized by reference to the remaining portions of the specification and the drawings.

BRIEF DESCRIPTION OF THE DRAWINGS

FIGS. 4A and 4B show a molding system in which a fluent mixture is transferred from storage into and out of state-change molds and changed from a fluent state to a stable state and back to a fluent state.

FIGS. 5A–5C show elastic-membrane inserts being expanded inside a hollow shape by filling them with a state-change mixture;

FIGS. 5D and 5E show stabilized templates of the interior;

DESCRIPTION OF SPECIFIC EMBODIMENTS

Figure 1A:
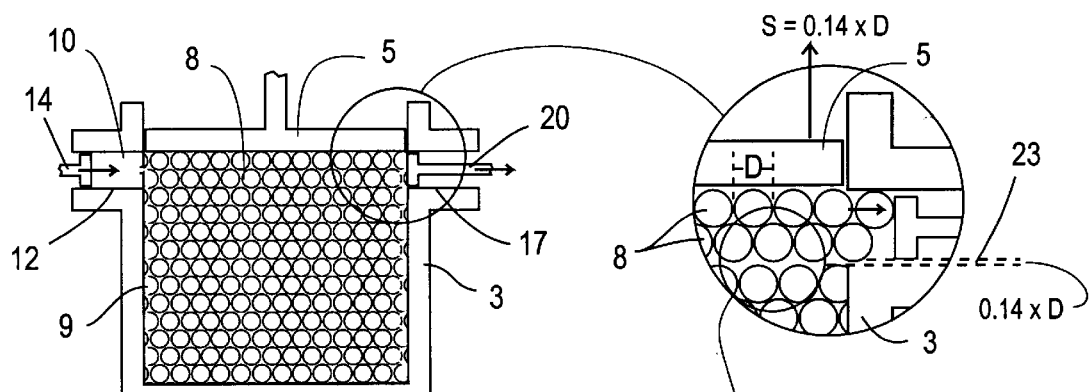
FIGS. 1A and 1B show a mixture of packed spherical bodies, surrounded by a liquid medium in a container with a piston lid, and further show ordered masses of the bodies undergoing shear or slip-plane movement by addition of a small excess of the medium.
Figure 1B:
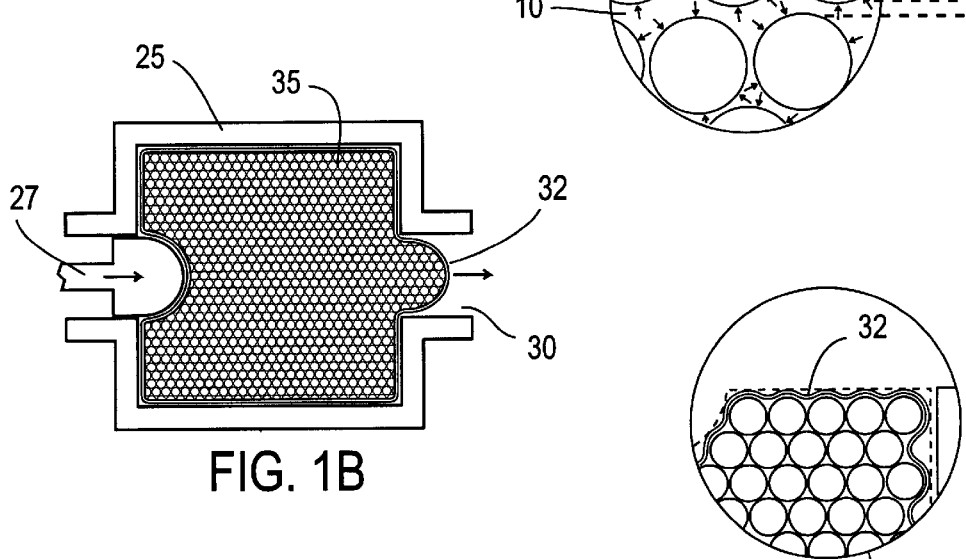

Behavior of State-change Mixture Comprising Solid Bodies and a Liquid Medium (FIGS. 1A and 1B)

Figure 2:
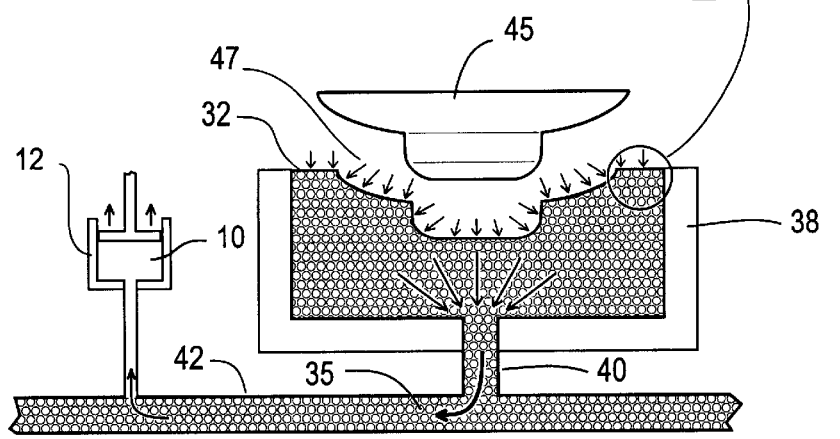
FIG. 2 shows a reformable tooling system in which a state-change mixture flows through small-diameter piping, is displaced from a chamber by a shape being pressed into a surface membrane and is stabilized by extracting the quantity of excess medium (transition liquid)

FIG. 1 through FIG. 3 introduce aspects of the invention including properties of various state-change mixtures, their behavior, and state-change operations.

FIG. 1A shows a chamber 3 with a piston-type lid 5 which is pressing on ordered, spherical, hard solid bodies 8 which are surrounded by a liquid medium 9 with the same density as the bodies. Chamber 3 has on its left side a tiny chamber 12 closed by a piston 14, which chamber contains an excess amount of liquid medium, hereinafter referred to as transition liquid 10. Chamber 3 also has on its right side a port 17 with a piston 20. Initially lid 5 is pressed against the solid bodies, causing them to be packed and nested against one another inside chamber 3. Therefore, the packed and abutted bodies act as a solid fill in regard to their resistance to compression.

The first enlargement of FIG. 1A shows lid 5 raised just enough to allow an ordered layer of bodies 8 to clear adjacent stacked layers. As the lid is raised, transition liquid 10 is added from chamber 12 by movement of piston 14 to fill the added clearance volume 23 with transition liquid. By measurement or calculation, the distance that the lid must be raised to establish this clearance is approximately 14% of the diameter of the spherical bodies. Therefore, if the bodies are of small diameter, the added volume to allow clearance is also very small.

The first enlargement also shows a bulk quantity of ordered bodies undergoing shear or slip-plane movement relative to the stationary mass of ordered bodies. This is caused by a further advance of piston 14, which drives more liquid into the mixture, forcing piston 20 out by increased liquid pressure and creating a volume within chamber 17 which the moving bodies fill. Free movement of the bodies can occur due to the increased clearance volume 23 between ordered rows of the bodies, with the clearance volume being filled with a quantity of transition liquid 10. Since there is a density match between the bodies and the liquid medium, this ordered quantity of bodies can move relative to the stationary mass of bodies along with the pressure-driven flow of the liquid medium, and with no more force than is necessary to cause flow in the medium. If this bulk movement were intended to occur at any point within the volume of the mixture, the total amount of clearance would have to be at least twice the amount shown or 28% of body diameter, since a bulk quantity of spherical bodies would have to clear stationary spherical bodies along at least two slip-planes rather than one as shown.

A second, further enlargement shows bodies 8 surrounded by liquid medium 9 and a quantity of transition liquid 10. Any pressure within the medium is distributed evenly against the bodies, while close body spacing assures that any displacement of the medium tends to carry along with it a constant, ordered volume of the bodies. Since the volume of transition liquid can be very small in proportion to the total mixture volume, any bulk transfer of the mixture is essentially a transfer of ordered, nearly packed solid bodies. This behavior of the bodies means that, in regard to flow qualities, the bodies in the mixture behave substantially as the liquid medium behaves.

These flow characteristics can be improved by adding a small quantity (generally less than 1% by volume), of a soluble long-chain polymer to the liquid medium. While the polymer somewhat increases the viscosity of the medium, a valuable benefit is that it aids in "streaming" the bodies past one another without friction-generating contact, with the suspended molecular chains acting as a zero-friction cushioning medium. This cushioning property is believed to facilitate non-contact momentum transfers from body to body, and the close-spacing of bodies in conjunction with this momentum transfer assures that slip-planes can form simultaneously and freely at any point within a mixture which has enough transition liquid added to form at least two slip-planes.

When piston lid 5 and piston 20 are returned to their first positions, the amount of transition liquid within clearance volume 23 is driven out of the mixture by displacement and returned to medium chamber 12. The piston lid then pushes against the ordered bodies 8, which resist the piston since they are again in a regular, packed, consolidated configuration, and they again furnish resistance to further motion. Due to the very small difference in volume between the packed, compression-resisting bodies and the liquid-borne mobile bodies, in effect the mixture is behaving as a state-change fluid with mobile and solid transition states.

FIG. 1B further emphasizes the liquid-like flow characteristics of the solid-body containing mixture. A chamber 25 has a piston 27 and an open port 30, and contained within the chamber is the sealed elastic envelope 32 which contains incompressible, mobile state-change mixture 35. The mixture has an excess quantity of transition liquid within it, giving it liquid-like flow properties. As the piston is advanced into the chamber, the membrane begins to conform to the piston's contours. At the same time, any force exerted on the mixture by the piston is converted to pressure forces exerted equally throughout the chamber. This pressure force causes the membrane to be stretched outward into the open port as the piston is advanced against the membrane, and a volume of the mixture equal to the displacement of the piston will move into the stretched portion. Due to the extremely small volume of excess transition liquid, the displaced mixture volume is essentially the same as an equal mass of ordered, packed solid bodies.

Application of State-Change Mixture (FIG. 2)

FIG. 2 shows the elements of a system using the materials and principles of FIGS. 1A and 1B to achieve a practical result. An open container 38 has elastic envelope 32 filled with mobile state-change mixture 35, yet this envelope has a port 40 communicating with a mixture transfer manifold 42. The elastic envelope could be replaced by a membrane which is sealed across the opening of container 38, as long as the container is completely sealed except for its connection to manifold 42. Transition liquid chamber 12 is attached to the manifold rather than container 38, and the mixture is free to flow through the manifold. When an impression-making pattern part 45 is impressed into the free surface of envelope 32, a volume of the mixture equal to the volume of the pattern is displaced and flows out of the chamber-constrained envelope. Piston 14 is then drawn upward to extract transition liquid 10, causing all solid bodies of the mixture to make consolidated, ordered contact. If the extraction force of piston 14 is increased beyond the low level necessary to remove the excess, then a "negative" pressure relative to ambient atmospheric pressure will be created within the mixture if it is contained in a sealed envelope, and manifold. Depending on the properties of the mixture, consolidation under atmospheric pressure may or may not be necessary to achieve desired levels of consolidated resistance to externally imposed forces.

The impression created by part 45 is now a stable structure 47 and is a negative representation of the shape which was pushed against the membrane. Stability of this impression is caused either by the inherent abilities of the mixture to cause the solid bodies to cling together, or by the ambient pressure pushing against the membrane and the membrane pushing the bodies into locking contact. Therefore the result of confining the mixture within an elastic envelope, providing one surface of the envelope as a surface membrane, providing flow of the mobile mixture into and out of the envelope, and providing a method to add and extract excess liquid medium, is to create a formable and reformable surface which can easily conform to an impressed pattern, which can then be stabilized, and which can repeatedly be made either conformable or stable with the transfer of a small quantity of transition liquid.

The enlargement of FIG. 2 shows some of the limitations and constraints on the accuracy of an impression created with these solid-body/liquid mixtures and a confining membrane which is pushed against the bodies by exterior forces such as ambient atmospheric pressure. The dashed line shows the profile which, ideally, membrane 32 would assume. In fact the membrane tends to follow the contours of the surface bodies; however, it can be appreciated that there is a relationship between the membrane thickness and the size of underlying solid bodies which determines the surface "smoothness." From testing it has been determined that the surface is essentially smooth if the solid bodies have a maximum dimension of no more ½ the thickness of an elastomeric membrane made of latex rubber, silicone, or urethane. Apparently the compression of the membranes at regions of inward indentation (into the surface gaps between contacting bodies) thickens these regions. Also, perhaps there is a tendency, through isotropic distribution of forces in an elastic membrane, for the outer surface to be flat despite small ripples or indentations on the opposing surface.

Further Mixture Descriptions (FIGS. 3A–3F)

Figure 3A:
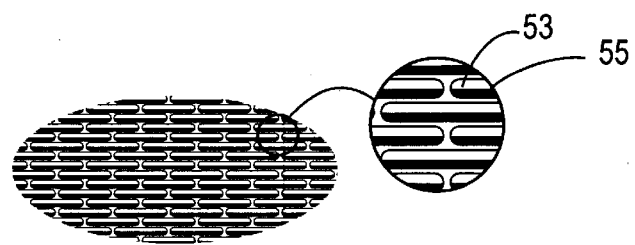
FIGS. 3A–3D show mixture bodies of varying geometries.

FIG. 3A shows a state-change mixture in which the solid bodies are geometrically regular flakes with rounded edges, and the bodies are aligned and generally held parallel to one another due to limited clearance and due to having a dual-density, self-orienting property. For instance the bodies might be formed from a laminate in which the top half 53 is of lower density than the liquid carrier medium, and the bottom half 55 is of higher density, with the combination having a similar density to the medium. With a small quantity of excess liquid (the transition liquid quantity) which perhaps furnishes no more than a few molecular layers between each body, the bodies will be supported and easily moved with respect to one another by liquid flow as previously described. The edges of the bodies might be rounded, as by a tumbling and polishing operation, to facilitate this liquid-supported motion without having sharp or flat edges collide and stick to one another. The medium might also incorporate a "cushioning" or lubricative material such as the soluble polymers previously described.

As with the spherical bodies, when the flakes are consolidated into ordered contact with one another they again create a compression-resisting mass or structure dependent upon the surface properties of the bodies and the consolidating forces applied to the body mass. The flakes have many times the contact area of spheres and so could have proportionately greater surface friction, adhesion, or other desired properties. A mass of consolidated flakes would also tend to be denser, have higher laminar strength, and be less resilient than spheres of the same materials, since more material is contained within the mass and more material is in contact. A disadvantage of the flakes might be a greater tendency to stick together and to rotate out of alignment when mobile, as for instance under shear forces which are exerted perpendicularly to the aligned contacting surfaces. The flakes could be returned to an oriented state simply by suspending them in a considerable excess of carrier medium; however this might not be compatible with an application where accurate shape replication is required. In regard to sticking, there may be commercially available surface treatments, such as the adhesion of partially cross-linked soluble polymer formulations which will cause liquid-immersed surfaces to separate.

Figure 3B:
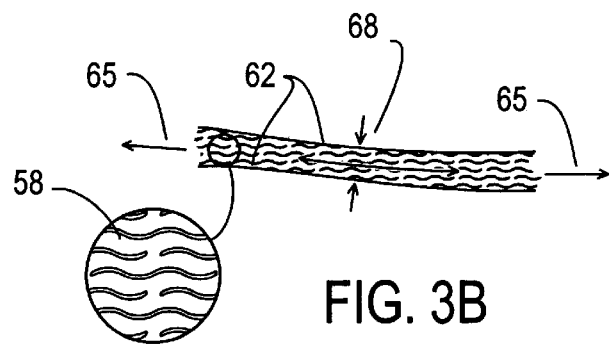

FIG. 3B shows another type of mixture, with the bodies 58 consisting of closely spaced short fibers. Since the fibers have a density matching that of the liquid carrier medium, they tend to flow with the medium when it is displaced, yet do not rotate or disorient due to the close spacing and "streaming" characteristics of the carrier medium, such as are furnished by dissolved long-chain polymer solutions. In this figure the displacement is caused by linear stretching 65 of a thin membrane envelope 62 containing the mixture. With a constant-volume containment, this stretching causes a thinning 68 of the state-change mixture. It is contemplated that the fiber-like bodies would tend to move freely due to being partially aligned with the direction of flow, yet remain in a generally uniform and ordered structure. When the fiber bodies are forced together by extracting the transition liquid and causing ambient pressure to drive the membranes against them, a stable continuous mat is formed.

The stabilized mat thus formed will tend to resist extension or compression in the plane of the mat if the fiber-bodies' surfaces have a significant coefficient of friction. If very thin, the mat thus formed would tend to be flexible and springy if the fibers were likewise springy. The fibers as shown also have a wavy or smoothly crimped geometry which would tend to make them more resistant to slipping when the mat is flexed. It is envisioned that, among other uses, a fiber-filled mixture in such a thin envelope could be used as a stretchable "pattern" for taking custom clothing dimensions. For instance filled envelopes might be incorporated into a spandex-like garment which is slipped on while the contained mixture is in the mobile state, and is then stabilized by extracting the transition liquid. The pattern garment might have multiple zippers so that it could be removed without putting excessive force on the consolidated mat structure within each envelope.

Figure 3C:
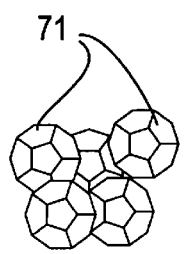
Figure 3D:
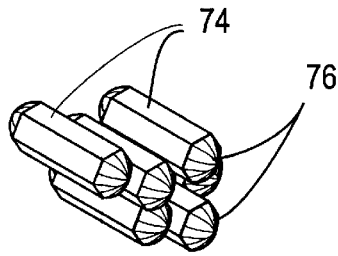

FIGS. 3C and 3D show two more types of prospective solid bodies. Nesting dodecahedrons 71 are shown in FIG. 3C and may have close to the same mobility and freedom of multi-directional slip-plane formation as is furnished by spherical bodies. However, as with any regular polyhedrons, these bodies can be solidly packed when consolidated and so have a compression resistance equal to the parent material. In addition there is total surface contact with its attendant advantages or disadvantages.

FIG. 3D shows hexagonal rod elements 74 with rounded ends 76. These would again be ordered and closely spaced in the mixture, and would furnish a high degree of packing and surface contact. A consolidated mass of such rod-like bodies would tend to have a directional beam strength aligned with the long axis, and strength would be a function of the length of the rods. Applications might include but not be limited to structures which "break" along one axis, yet deform or progressively crumple along another axis of stress.

Other types of solid bodies might be utilized without departing from the spirit of the invention. For instance, besides spheres, flakes regular polyhedrons, rods and the like, shapes with protuberances or hollows could be used. Some of these might even mate together under consolidating force and require extensive pummeling or rolling forces to separate again into separate bodies. Likewise, flakes might be wavy, have various perimeter shapes etc. There might also be an extensive variety of surface properties, such as low-friction surfaces which will permit slip-displacement even when the bodies are forced together, or high-friction "waffle" surfaces which completely resist slip-displacement when consolidated together. The surfaces might even have suctioncreating surfaces or other means for causing the bodies to cling together mechanically so that the consolidated state-change mixture has considerable resistance to tensile as well as compressive forces. Similarly the medium might have specific switchable properties, for instance performing as a lubricant or, under desired force or temperature conditions, acting as an adhesive which binds the bodies when they are pushed against each other. Finally, as will be further described in reference to FIGS. 10A and 10B, the carrier medium might itself be a material with a reversible state-change, such as a paraffin or a eutectic alloy which melts and solidifies within a useful temperature range.

Figure 3E:
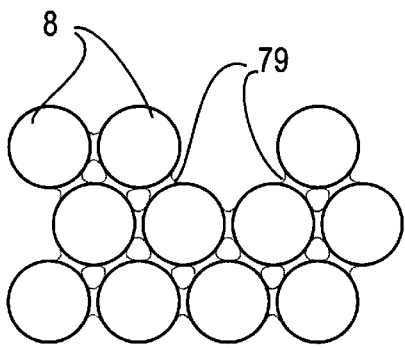
FIG. 3E shows bodies adhered together by liquid surface tension.

The invention's method of providing near-liquid mobility, and either following or preceding that condition with a stable force-resisting state, may be further understood by considering the elementary model of FIG. 3E, The solid bodies 8 are shown free of containment and all forces other than liquid-medium surface tension at contacting regions. To reach the condition shown, first the transition liquid is extracted, and then further extraction reduces the liquid between particles to separate surface-tension "membranes" 79 which connect each body. Surface tension would cause the remaining fluid to force the already generally ordered solid bodies into stable, ordered, consolidated contact. Conceivably bodies with regions of mating contact, and with interstices remaining open to liquid flow between the bodies after contact, could have sufficient liquid removed that surface tension forces alone would push smooth mating surfaces into adhesion-generating contact. The polyhedrons and rods of FIGS. 3C and 3D might have small grooves or rounded edges to facilitate liquid medium extraction, which might be facilitated by driving the liquid out with air or another gas. Driven by surface tension and by electromagnetic forces between extremely smooth surfaces, any remaining liquid might be driven out, allowing relatively strong surface adhesion forces to develop. With the liquid medium reintroduced between the bodies, surface tension forces would cease to operate and polar molecules of the medium would again wet the bodies and wedge the mating surfaces apart.

It can be appreciated that this body-to-body adhesion, which is a prerequisite to developing tensile strength within the particle mass, can be furnished in numerous ways. For instance a solvatable adhesive can be used, in which case the liquid carrier medium may be a mixture of the adhesive and solvent. After consolidation, the solvent is pushed out of voids between bodies and the solvent is driven off by heating or dry air, leaving each body bonded to each other. When the medium is reintroduced, the adhesive bonds between the bodies are dissolved and mobility via the slight excess medium may again be employed. While the solvent-adhesive mixture might leave elastic bonds, a sodium silicate or "water glass" carrying medium could be used to create a rigidly bonded particle mass. Additional thermally switched adhesive mediums can also be imagined, such as thermoplastics with a low melt viscosity, waxes, or even water itself.

Figure 3F:
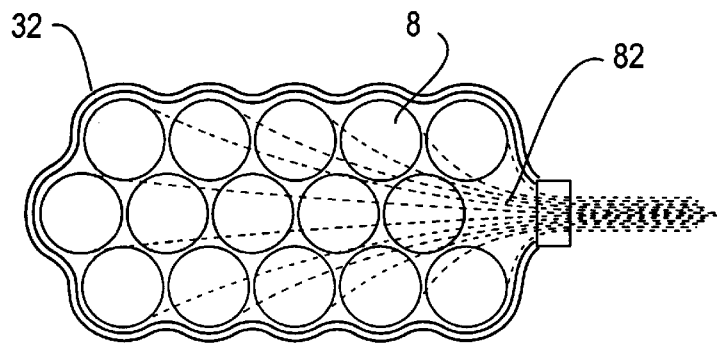
FIG. 3F shows bodies being consolidated by liquid tensile forces.

FIG. 3F shows a generally unrecognized consolidation force which can be applied by the liquid medium. In addition to the commonly understood action of consolidating a bead, microsphere, particle or granular fill through evacuating air from the containing sealed envelope, there is an additional consolidation force which can be imposed on bodies 8 within membrane 32 through employing the tensile strength of the liquid medium. This can be done with direct liquid extraction, whether with a piston and cylinder or other non-gaseous (i.e., vacuum pump) direct contact methods. This property is rated in terms of atmospheres of negative pressure, and while theoretical tensile strengths of common liquids range from 200 to 1,000 negative atmospheres (roughly –3,000 to –15,000 psi), more easily achieved laboratory results are in the range of 20–30 negative atmospheres (–300 to –350 psi). Assuming that the problems of sites of nucleation or contained gases can be handled in practical devices (easily overcome in laboratory samples), it can be appreciated that consolidation forces far in excess of that achievable by evacuation, with ambient pressures of 14.7 psi, can be achieved. Essentially, the solid bodies of the invention would be forced against one another as if tensile strands 82 were attached to each and all strands were pulled at once to drive the bodies against containment surfaces. Thus consolidation would take place even if a vacuum existed on the outer face of a containing piston or flexible membrane.

Elements of a Practical Molding or Templating System (FIGS. 4A and 4B)

FIG. 4A shows the main elements of FIG. 2, along with other elements for two significant applications of the state-change mixture in a practical molding and other impression-capturing or templating system. Starting from the left, the first element of the system is a storage and transfer system 84 which holds a sufficient quantity of the statechange mixture to allow a variety of shape-capturing operations to be performed by the system. Any reversible pumping mechanism (not shown) capable of transferring the mixture could be substituted for the transfer system piston 86 by being placed in the transfer line or manifold 42.

Valves 88, 95 and 99 may be included at the openings from manifold 42 to transfer system 84 and mold containers 97 and 100 which are likewise connected to the manifold. While not essential for operation of the system, such valves can serve at least two purposes. One is to isolate mixtures not undergoing state-changes, so as to minimize the amount of transition liquid 10 which must be transferred to effect the mobile-solid transitions. In addition, these valves would allow impression-capturing operations to take place separated in time, rather than simultaneously, in the containers 97 and 100, which can be connected to or isolated from transfer system 84 by the valves.

The second element from the left is a reversible transition liquid transfer device 91 with a solid body screen 93, so that the medium can be added or removed from the body mass without also adding or removing bodies from the total mixture volume which includes the quantities in the manifold. If the impression-capturing containers are isolated from the manifold 42, then device 91 would have to be connected directly to the mixture volumes of each container, as shown in the following FIG. 4B.

The third element from the left is impression-capturing container 97 with a holding cap or lid 105 which can secure a pattern part 45 in a desired position and orientation. The lid itself may also comprise a container holding a state-change mixture behind a membrane, perhaps with a tack-release adhesive on the outer surface to hold the part against the lid membrane. The lid could also be connected to manifold 42, perhaps through a flexible manifold line. The container is shown after part 45 has been pushed into the lower-container membrane. When the bodies are locked in place as described with reference to FIG. 2, a "female" tool 108, in the form of a negative impression of the part, has been created.

The fourth element of the system is a similar impression-capturing container 100 with lid 105. The lid holds a part 45 which has a cavity, and the state-change mixture has been pumped from the transfer chamber to push the membrane into the cavity. When the bodies of the mixture are locked in place by extracting the medium with the two-way pump as previously described, a "male" tool 102 has been created which protrudes above the lower container.

It can be appreciated that either container, with the form-creating shape (part 45) removed, can be utilized as a mold or die to produce a replica of the shape. For instance a curing liquid polymer can be injected into the left-most container, or a soft, deformable material "blank" can be formed in the right-most container by operating it as a pair of matched dies, through the actions of lifting the lid, placing the blank over the male tool, and then pressing the lid down against the blank.

FIG. 4B shows a method of providing maximum accuracy for the stabilized surface of a membrane. As transition liquid 10 is extracted, mobile mixture 35 continues to flow under pressure into the container. The FIG. 4B enlargement shows the result of this continued flow coupled with the placement of liquid transfer elements 91 ear the top of the membrane surface. As transition liquid is removed, the solid bodies shown with exaggerated size and spacing) gradually become closely packed, allowing time for any slip-planes to be filled in. If extraction of liquid 10 caused the membrane to push against the bodies prior to eliminating any slip-planes, the gaps in bodies along such planes might be locked into place, causing deformities or irregularities in the membrane surface and so in the negative representation of the impressed shape.

Such packing could also be facilitated by using floating bodies of lower density than the liquid carrier medium. The bodies would then tend to self-pack, due to their buoyancy, against the upper surface. However, the surface of the bodies would have to have no contact friction or tendency to increasingly adhere together under light contact forces. Otherwise there would not only be problems with the bodies filling in any voids or slip-planes; there could also be the well-recognized problems of settling and sticking together as occur with many solid-particle suspensions, especially when there is a density mismatch between the solids and the suspending liquids. As previously described, having matching densities and a "cushioning" liquid medium can eliminate these fluent-medium friction and adhesion problems.

Insert or Template Applications (FIGS. 5A–5E)

FIG. 5A shows a hollow shape 110, and FIG. 5B shows a group of thin, elongated membrane-template elements 115 which can fit through the open neck of shape 110. The template elements are connected to a supply of the state-change mixture, such as transfer system 84 of FIG. 4A, coupled with a transition liquid transfer mechanism such as element 91. Elements 115, shown in FIG. 5B, are pushed into the hollow shape and filled with the mixture so as to completely fill the interior as shown in FIG. 5C, and transition liquid is extracted from all of the elements simultaneously to stabilize them.

Since the solidified elements are together much larger than the open neck of the shape, one or more of the elements must now be emptied of the state-change mixture to allow extraction of some of the solidified elements as shown in FIG. 5D. After the stable elements are extracted, the shape is preserved by a transfer process, in which the elements are used to create a negative shape 118 in the state-change container-mold 121 shown in FIG. 5E. The dimensions of this element can then be recreated at any time by reinserting an emptied membrane element into the mold, refilling it with the state-change mixture and then stabilizing it.

The formed and stabilized template elements 115 are then placed back in hollow shape 110 along with the non-filled elements. The non-filled elements are filled and solidified, the first set of solidified elements are now emptied of the state-change mixture and removed, and the now-solidified elements can again have their contours preserved in a transfer mold 121. It can be appreciated that, by this iterative process, the entire volume and any contours of the hollow shape's interior can be templated, and at the end of the process a complete "male" tool replica of the interior will be created from the membrane elements.

This male tool replica of the hollow shape's interior can then be employed, along with a female tool replica of the exterior of the shape, to produce a replica of the shape with a moldable material. For instance, to make a replica of the hollow shape from a curing liquid polymer, the male tool needs to be held in the same location inside the female tool as the interior hollow of the shape has in relation to the exterior of the shape. The space between the male and female tools is then filled with the polymer, and after its cure the interior male tool is reduced again to the unfilled bundle of membrane elements and removed, while the female tool is opened and the finished part removed. If all of the solidified elements of the male tool have been templated by female mold cavities, then the elements can be quickly reconstituted from the female molds without again being applied to the interior of hollow shape 110, and the original hollow shape can be quickly replicated again.

It can be appreciated that numerous variations of this replication process can be performed without departing from the spirit of the invention. For instance the original hollow shape might be split into sections so that the iterative process, just described, of forming a male replica of the interior, is instead done in a single step, with the sections of the shape being put together, the interior being templated, and the sections being taken apart again to free the interior template. As yet another example of variations, the male tool could be used to produce a female mold which would then be used to shape a single, larger membrane-element shaping tool.

Figure 6A:
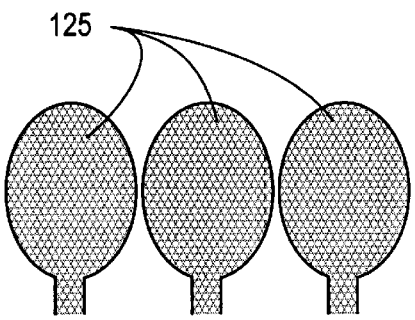
FIGS. 6A and 6B show elastic-membrane envelopes being grouped together to form a complex cavity and shows the membranes sliding freely over the bodies and each other to arrive at the final shape.
Figure 6B:
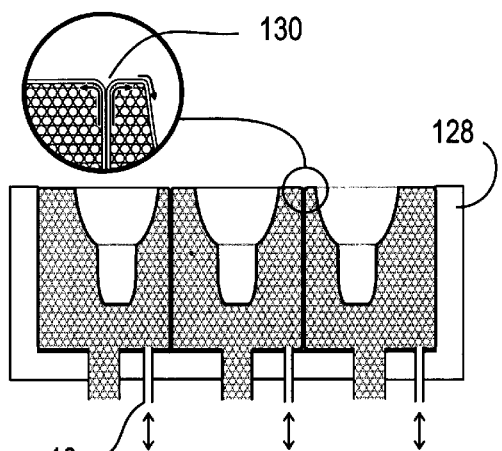

Use of Grouped Membrane Elements to Replicate Deep-Relief, Highly Contoured Shapes (FIGS. 6A–6C)

Groups of membrane elements have another valuable property besides the iterative shape-capture abilities described with reference to FIGS. 5A–5E. Since elastic, extensible membranes have a finite limit in terms of their degrees of stretch, replicating shapes with a great deal of variation might require limiting the degree of stretch of any one element by sharing the elongation amongst two or more membrane elements or envelopes. FIG. 6A shows a triplet of balloon-like elements 125, while FIG. 6B shows the elements inside a common container 128. The surfaces of the membranes are lubricated or otherwise free to slip past one another in addition to being freely mobile over any body of the state-change mixture within, as shown at region 130 in the 6B enlargement.

As a complex and highly contoured shape is pushed into the membrane envelopes, the surfaces of the membranes stretch. Due to the mobility of the membranes this stretch is not localized, i.e., limited to the portions of the surfaces in contact with the shape, but rather distributed through each membrane. In other words the sides, and perhaps even the bottom of each envelope, contributes its stretch to the stretch of the membrane portion in contact with the shape. In effect the "free surface of stretch" encompasses much of the membrane envelope instead of being limited to the top surface.

Figure 7A:
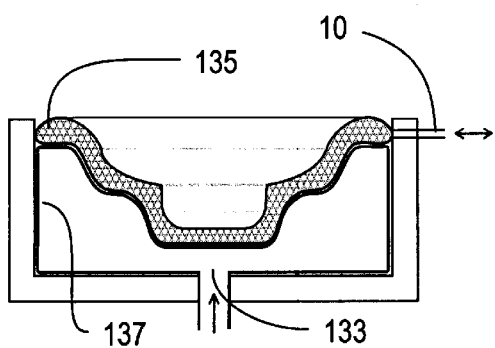
FIGS. 7A–7D show state-change mixtures which are not transferred, and shows them in thin envelopes which are pushed against shapes by fluid pressure and an array of sliding pins, on the tips of an array of pins with small volumes of mixture in separate envelopes, and shows the mixture in a chamber with expandable fluid-filled elements within the mixture volume.
Figure 7B:
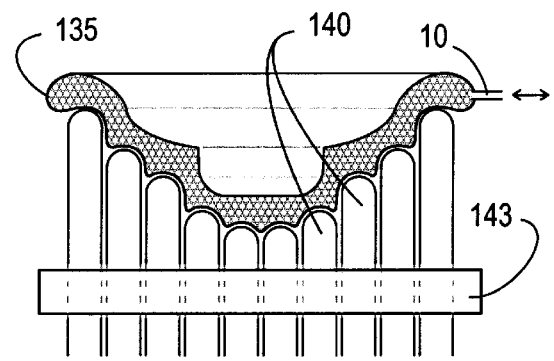
Figure 7C:
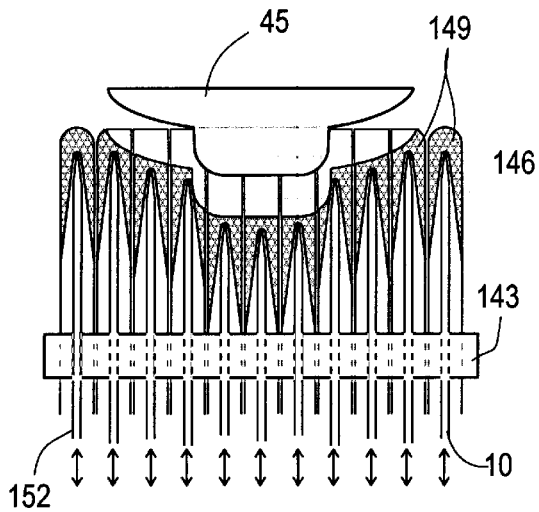

State-Change Mixture in Constant-Volume Elastic Envelopes (FIGS. 7A–7C)

FIG. 7A shows an embodiment of the invention which minimizes the, volume of state-change mixture required to replicate a shape, and also eliminates the need to transfer the mixture into and out of a shape-capturing container. While in a formable state the mixture is held in a thin elastic-membrane envelope 135 which is driven against a shape (designated 45 in accordance with the reference numeral used in FIG. 2) by a fluid (gas or liquid) 133. The fluid might be contained in a second underlying flexible, extensible envelope 137, so that it will easily stretch and conform against the envelope containing the state-change mixture, yet will not leak out around the edges. The state-change mixture is then solidified, and if a compressible fluid has been used to force it against the shape, the pressure must be released before the shape is removed. The resulting rigid template of the shape can be used while still in place in the surrounding container, or it can be removed as a shell and applied to other uses. For instance, it can be placed into transfer mold 121 of FIG. SE, in effect being used as a tool to replicate the impressed face of the original shape.

This embodiment might also employ a second state-change medium in underlying envelope 137, or have the mixture contained by having the upper envelope 135 sealed to the open top of the container. If upper envelope 135 held a very heavy state-change mixture as will be described with reference to FIG. 10A, then it might be desirable to give the mixture a stable "bed" consisting of a much lighter state-change mixture. It is contemplated that such an embodiment might be employed in which a very durable, multiple-use tool would be prepared in the upper envelope and then used for molding or stamping operations in which such stable backing is necessary.

FIG. 7B shows another embodiment of the concept which minimizes the volume of state-change mixture required to replicate a shape. A series of pins 140 in an array 143, with the pins free to slide past one another and be locked, can be employed to push envelope 135 against a shape. If the pins are then locked in place and the state-change mixture solidified, a template, die or mold surface is created which again has the same degree of stability as furnished by the full volume of solidified mixture in rigid containers as previously described.

FIG. 7C shows a variation of pin array 143 which also combines the multiple-envelope feature of FIGS. 6A and 6B. Each tip 146 of the pins has mounted on it a shaped elastic membrane envelope 149 containing a state-change mixture, with each envelope connected to a transition liquid transfer mechanism via the lines 152. With the contained mixture in the mobile state, the pins and mounted envelopes are pushed against a pattern shape, or the shape is pushed down against the pins which offer resistance to being moved. The pins are then locked in place and transition liquid is extracted to solidify the mixture, again creating a stable impression or negative of the pattern shape.

The pins can have a variety of other forms. The pin itself might consist of an envelope which contains a state-change mixture, so that even more shape-assuming versatility is possible. For instance the envelope-pins might be able to expand sideways into deep or long undercuts in a shape, or they might be employed inside a hollow body as are shown in FIGS. 5A–5E, and likewise be iteratively filled and stabilized with the dimensions transferred to other pin arrays or transfer molds for "storing" impressions of the shape. The envelope-pins might also have a smaller stiff pin or one or more flexible "spine" pins within the envelopes which could be selectively placed or withdrawn to further facilitate shape-capturing or stabilization of solidified pin elements. The pins could also contain tillable voids as will be shown in the following FIG. 7D and FIGS. 8A–8D.

Figure 7D:
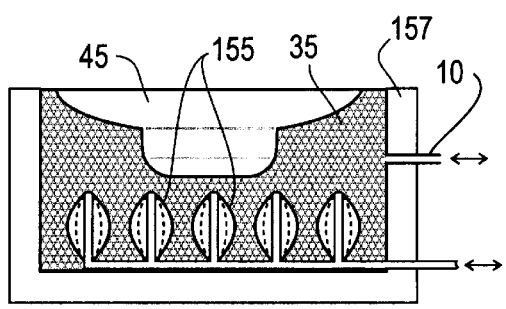

FIG. 7D shows another state-change mold or templating system in which the mixture 35 is not transferred into or out of a mold chamber. Instead there are expandable elements 155, and a fluid is transferred in or out to vary the volume within the chamber or cavity of mold 157. This fluid could again comprise a state-change mixture, although it's not clear that any benefit would be derived unless the first mixture was difficult to transfer, was very expensive, or was otherwise unsuited to being transferred through manifolds.

Impression-Molded Mixture with Voids (FIGS. 8A–8D)

Figure 8A:
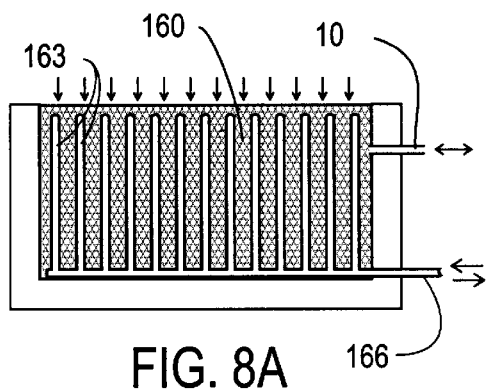
FIGS. 8A–8D show voids within sculptable, quasi-stabilized volumes of state-change mixtures, and shows impression-forming of the mixture by pushing a shape or tool against a surface membrane and driving solid bodies into the voids and also show displacement-forming of the mixture by pushing bodies along the surface.

FIG. 8A shows a volume of state-change mixture 160 which can be molded into a desired shape by taking advantage of "quasi-stable" properties which are achieved by allowing ambient pressure to consolidate the bodies, yet making provision for displacing the bodies. An array of flexible, thin-walled tubes 163 permeate the volume of the mixture, and when the array is pressurized with a fluid 166 (liquid or gas) and then drained, a void structure is created within the volume of bodies. The volume with voids is stable, since ambient pressure also acts within the drained tubes to push against the surrounding bodies with the same force as imposed on the membrane.

Figure 8B:
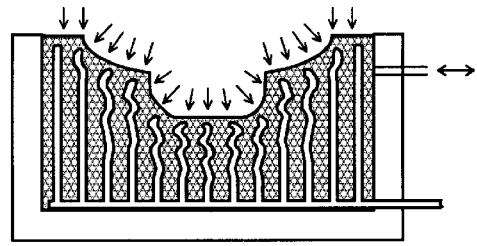

FIG. 8B shows the volume of state-change mixture after an object has been pushed against the surface membrane. The void elements of the void structure have partially collapsed, furnishing room for the displaced bodies of the mixture to move away from the region of displacement created by the object. Ambient pressure against the membrane keeps the bodies stable, and the non-collapsed void structure is then refilled with a liquid, or perhaps with a state-change mixture, in order to keep the volume of the state-change mixture from further collapsing when the formed shape is used as a mold or tool.

Figure 8C:
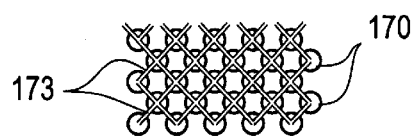

FIG. 8C shows another type of void structure. This is created by a three-dimensional array of hollow, collapsible nodes 170, much like tiny balloons, which are interconnected by flow tubes 173. The void structure resides inside a volume of state-change mixture in the same manner as the tube structure in FIGS. 8A and 8B, and is likewise filled with a fluid, drained, and then refilled with an incompressible liquid or state-change mixture after the mixture is displaced to the desired shape. It is envisioned that such a regularly-space, many-void structure could fill perhaps 80% of the total mixture chamber volume, and so permit a higher degree of displacement-forming than tube structure 163. This distributed-node structure creates what is in essence a quasi-stable, selectively collapsible "foam" structure, in which the bodies have a large percentage of evenly distributed void-volume into which they can be displaced.

Figure 8D:
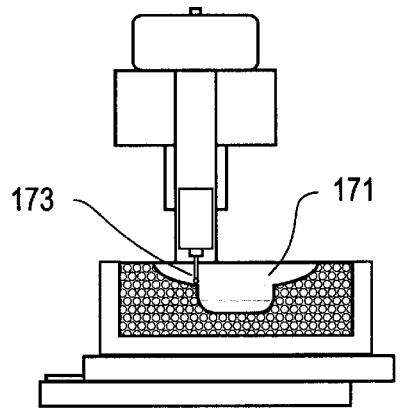

FIG. 8D shows how an indentation or impression 171 could be automatically "sculpted" into a void-filled volume of the state-change mixture. An automated milling machine has a small shaping or sculpting tool 173 mounted in its spindle, which doesn't need to rotate. The sculpting tool is a small ball, and the mill creates the desired shape with two distinct operations. The first operation is a tamping motion, with the tool pushed repeatedly against surface of the mixture to rough out the shape, thereby leaving a dimpled surface. In the second operation, the ball is moved with a sliding motion along the membrane to smooth out the surface. There is a surface lubricant (not shown) to allow the ball tool to slip freely over the containing membrane without catching.

The thin mixture-containing envelope of FIG. 7B, supported on a pin array could also be sculpted by use of such an automated tool. However, this envelope, as well as the envelope-tipped array of FIG. 7C, might be formed to shape much more quickly than a bulk quantity of the medium as previously discussed. Each pin could be moved separately from the surrounding pins by being pushed vertically by a tool, with the whole array being quickly "punched" into a predetermined position. Following this positioning, the pins would be locked in place, and the smoothing motion of the tool is applied.

Figure 9A:
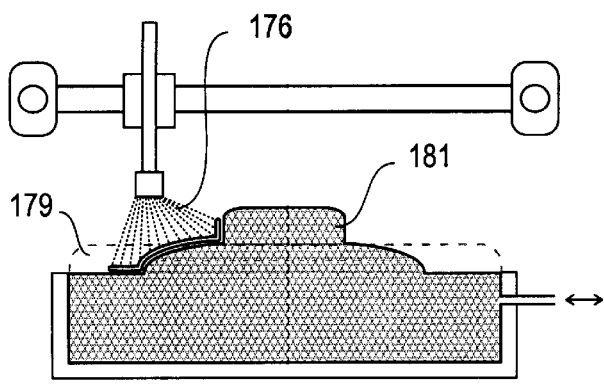
FIGS. 9A and 9B show a sculptable volume of the state-change mixture being shaped by progressively displacing mixture bodies along a membrane surface with a device which assumes a variety of profiles.
Figure 9B:
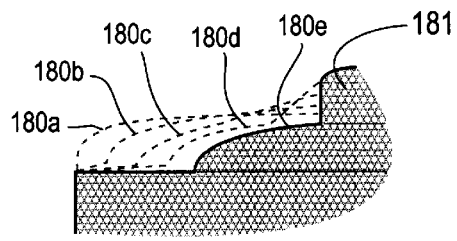

Displacement Sculpting (FIGS. 9A–9B)

FIG. 9A shows another type of automated shaping tool 176, while FIG. 9B shows a progressive displacement-sculpting method. The shaping tool is of a "profilometer" type, in which a smooth contact element is automatically configured through a sequence of curves as it moves over the sculptable surface. The tool is used to progressively and sequentially displace the state-change mixture, with an enveloping membrane being held against the surface bodies by pressure differential as previously described. The tool moves a layer of bodies along the surface of the underlying bodies, in effect "sweeping" them along beneath the surface of the membrane, which slips freely under the tool and also over the surface of the stationary beads underlying the displaced beads. Through a series of such sweeping movements, a portion of the body mass 179 is displaced (as shown by sequential dashed contoured lines 180a–180d and solid contour line 180e) to create the desired shape 181. It can also be appreciated that the sweeping tool can be used to impression-mold a state-change mixture with voids, and it is contemplated that both the impression-molding and displacement-sculpting methods would be used together in many forming operations. The profilometer tool could also be used for tamping, and would perform such an operation in addition to the sweeping or smoothing operations, much more quickly than could the single ball tool of FIG. 8D. Such a profiling device could also be employed with the envelopes and pin arrays of FIGS. 7B and 7C, as well as with the non-membrane system to be described with reference to FIG. 10B.

Further Mold and Tool Embodiments (FIGS. 10–13)

Figure 10A:
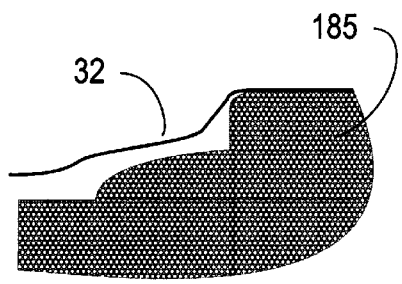
FIGS. 10A and 10B show state-change mixtures with state-change liquid mediums and a mold system which dispenses with a surface membrane.

FIG. 10A shows a state-change mixture 185 which has a state-change carrier liquid medium. This might be, for instance, a paraffin or a eutectic alloy which changes from a liquid to a solid at a temperature which is useful for mold or tool applications. As earlier described, the bodies of the mixture are preferably of the same density as the liquid so as to be neutrally buoyant. For instance paraffin and polyethylene beads have practically the same density, while indium-based eutectic alloys have densities which can be matched by various copper, lead and tin-alloy beads or bodies. The membrane 32 which allows the ambient-pressure stabilization of the mixture is shown being removed. If, for instance, the indium alloys were employed with hard metal beads to which there is good surface adherence, the resulting form would be a substantially hard-surfaced metal tool which is suitable for stamping, high-pressure injection molding and the like.

Figure 10B:
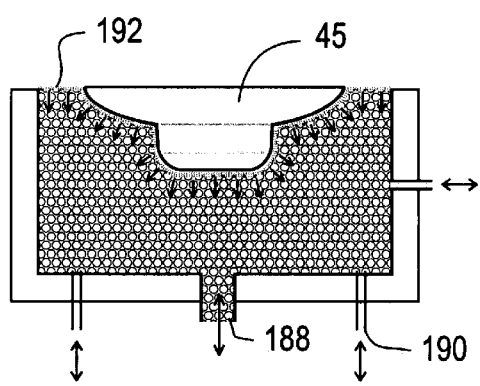

FIG. 10B shows another mixture 188 with a thermal state-change liquid carrier medium 190, in a mold system which dispenses with the membrane envelope. Instead the exposed surface 192 of mixture 188 is cooled so that the liquid begins to congeal as pattern part 45 is pressed into it. The excess fluent mixture is drained through valve 195 as the part further deforms the surface, and then thermal liquid 190 is drained while surface 192 is further cooled. The mixture can again be consolidated by ambient pressure, since the congealed and cooled surface is air-impermeable.

The non-membrane system of FIG. 10B can also be employed with a mixture in which the solid bodies adhere against each other upon contact. For instance the flake-bearing mixture of FIG. 3A could be impressed with pattern 45 in the same manner, with the pattern being coated with an anti-stick layer. Draining of the transition liquid would cause the flake bodies to make contact, following which the very slight dimensions of any interstices could further permit consolidation under ambient pressure. In effect the surface flakes would form a barely permeable skin, aiding in consolidation of the body mass.

Figure 11:
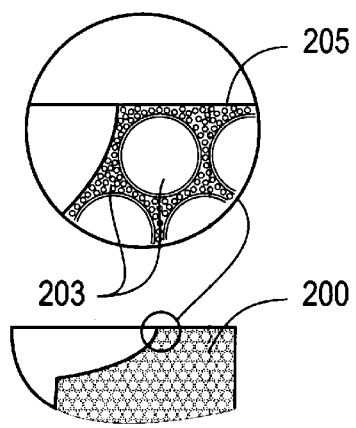
FIG. 11 shows a mixture comprising hollow beads and a fine-celled foam or froth in place of the liquid medium.

FIG. 11 shows a low-density state-change mixture 200. In this example, hollow beads 203 are carried in a frothed medium 205 comprising small bubbles. As with the earlier-described mixtures, this mixture can flow and be pumped to and from containers through small-diameter tubing or piping, yet still constitute a "mobile solid" which is stabilized by extracting the froth to below ambient pressure. In this case, the froth would likely return to a liquid state, since the bubbles would expand and rupture when the carrier liquid was suctioned from the mixture container as previously described. However, the froth could be reconstituted from the liquid and pumped into the bodies to regenerate the mobile mixture.

It is envisioned that this light-weight state-change mixture could be usefully employed in at least two situations. For instance if a very large template were required, such as for capturing the dimensions of a domed ceiling, then the light-weight mixture would make the operation much easier to accomplish, utilizing a variation of FIG. 6A in which the membrane-envelope is pushed against the ceiling with air pressure. As another example, if a low contact pressure is required for capturing dimensions, such as when preparing a negative mold of a burn victim's face, then the low density of the mixture, combined with a very soft conformable membrane configuration (following the multiple-membrane approach of FIGS. 5A–5E or 6B, for instance), would allow such a delicate operation.

The frothed medium might serve an additional function when the bodies are consolidated by suction of the froth from the body mass. The bodies could have their surfaces wetted by residual liquid after the bubbles were ruptured, and if the liquid had an adhesive quality when dried, then a drying gas could be passed through the bodies with the gas pressure held below ambient pressure. The gas would dry the adhesive and adhere the bodies together while retaining the formed shape. If the adhesive also bonded the membrane to the surface bodies, then the formed template or tool could be made resistant to a vacuum exterior to the membrane, and so could be used for vacuum-assisted thermoforming. After use, the frothed medium would be reintroduced so as to wet the adhesive and so free up the bodies to be mobile once again.

The stable, bonded form could also find a permanent or semi-permanent use, as for a custom seat or hand grip item. In this case the elastic membrane might have a durable exterior, such as a nylon-fiber stretch-fabric, and the bodies might be elastomeric so that the items are resilient. If a softenable adhesive were utilized as just described, then the item could be reformed as desired.

Figure 12:
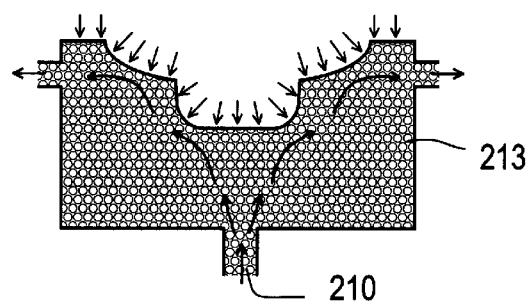
FIG. 12 shows the circulation of liquid in a stabilized mixture in order to effect temperature change of a template or tool.

FIG. 12 shows the liquid portion 210 of a state-change mixture circulating through a stabilized volume 213 of the mixture. This liquid circulation could be usefully employed to heat or cool a tool and would be achieved by maintaining a pressure differential between the lower entry port and the upper exit ports. The pressures at these ports would also be kept below ambient so that the upper-surface membrane would continue to be pushed against the bodies and so keep them stabilized.

Figure 13A:
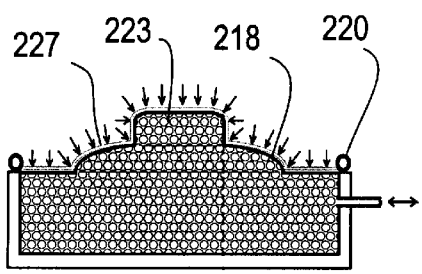
FIG. 13A shows a membrane envelope being forced against a shape by extracting air between the membrane and the shape.

FIG. 13A shows a state-change mixture-containing thin membrane envelope 218 with a seal ring 220 around its perimeter. The seal fits the edge of the container in which a male template 223 has been previously formed. The envelope is forced down against the tool by extracting the air which resides between the envelope and the template. The mixture within the envelope is then stabilized to create a thin-shell representation 227 of the template.

Figure 13B:
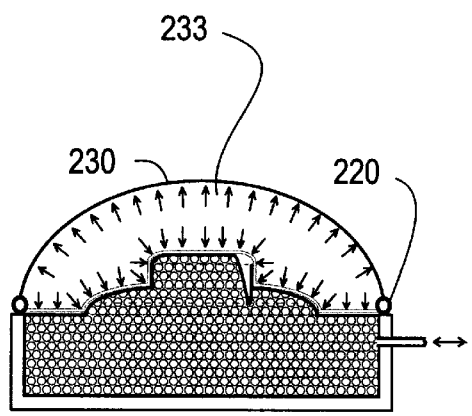
FIG. 13B shows a membrane envelope being pushed against a shape by pressure applied between the envelope and an outer membrane.

In FIG. 13B there is an additional membrane 230 attached to perimeter ring 220, which in turn is again secured to the perimeter of the lower container. Pressurized air 233 is introduced into the space between this membrane and the mixture-containing membrane envelope, forcing the membrane envelope against the template.

Conclusion

While the above is a complete description of specific embodiments of the invention, various modifications, alternative constructions, and equivalents may be used. Therefore, the above description should not be taken as limiting the scope of the invention as defined by the claims.

What is claimed is:

1. A method of making and using a reformable tool having a surface portion characterized by a desired shape comprising:

providing a volume of a mixture in a formable state, the mixture having solid and liquid components wherein
the solid component comprises a plurality of solid bodies, and
the liquid component fills the interstices between the bodies, and includes an excess amount of liquid beyond an amount that would be needed to fill the interstices when the bodies are packed, the excess amount of liquid thus allowing the mixture to be in the formable state;

causing a surface of the volume to assume the desired shape;

extracting the excess amount of liquid to cause the mixture to transition from the formable state to a stable, force-resisting state where the bodies make nested, packed, interlocking or otherwise stable consolidated contact so that a portion of the volume has a stable surface portion characterized by the desired shape;

subsequently conforming a body of formable material to the stable surface portion of the volume in order to impart a shape to the body of formable material that is complementary to the desired shape;

subsequently stabilizing the body of formable material so that the body retains the shape that is complementary to the desired shape; and subsequently reintroducing a sufficient volume of liquid to allow the mixture to transition from the stable, force-resisting state to the formable state.

2. The method of claim 1 wherein said causing a surface of the volume to assume the desired shape comprises placing the mixture in a cavity mold that has a surface complementary to the desired shape.

3. The method of claim 1 wherein said causing a surface of the volume to assume the desired shape comprises contacting a surface of the volume with an object that has a surface complementary to the desired shape.

4. The method of claim 1 wherein said excess amount of liquid is the minimum quantity to create a fluent condition by providing a predetermined clearance between the bodies, wherein the clearance permits the introduction of at least two simultaneous slip-planes between geometrically ordered bulk masses of the bodies.

5. The method of claim 1 wherein said liquid component and said bodies are of matching densities.

6. The method of claim 1 wherein said liquid component and said bodies are of differing densities.

7. A method of making a formed shape having a surface with a desired contour, the method comprising:

providing reformable tooling that includes a volume of a reversible state-change mixture in a stable force-resisting state, the mixture having solid and liquid components wherein
the solid component comprises a plurality of uniform solid bodies which are geometrically ordered, packed and nested against one another, and
the liquid component fills the interstices between the bodies; adding an additional quantity of the liquid component, referred to as the transition liquid, sufficient to provide a clearance volume between the bodies;

exerting pressure forces on the liquid component so as to cause at least two slip-planes to form, within the clearance volume, between geometrically ordered bulk quantities of closely packed bodies in the mixture, thereby causing the mixture to transition to a formable state;

conforming a surface of the volume to a surface of a pattern having the desired contour;

extracting the transition liquid to cause the mixture to transition from the formable state to the stable state where the bodies make geometrically ordered, packed and nested contact, with the packed and nested bodies acting as a solid fill which is resistant to externally imposed forces, thereby providing a stable surface portion of the volume that is complementary to the desired contour;

subsequently conforming a surface of a body of formable material to the stable surface portion of the volume in order to impart the desired contour to the surface of the body of formable material; and subsequently stabilizing the body of formable material so that the surface of the body retains the desired contour, thereby defining the formed shape.

8. The method of claim 7 wherein, with the transition liquid extracted so that the solid bodies are in a stable configuration with ordered, close-packed contact, the degree of resistance to externally imposed forces depends on at least one tailorable physical property in the set that consists of body shape, surface contours, elasticity and compressibility, and body surface properties such as roughness, smoothness, and molecular adhesion.

9. The method of claim 7 wherein said liquid component provides sufficient support or buoyancy, cushioning or lubricity to said bodies to create movement of ordered bulk masses of the bodies along slip-planes by liquid pressure differential or through externally imposed forces which displace the transition liquid and the supported bodies along with the liquid.

10. The method of claim 7 wherein said liquid component furnishes adhesion between said bodies while in nested, packed or otherwise stable consolidated contact.

11. The method of claim 7 wherein said liquid component and said bodies are of matching densities.

12. The method of claim 7 wherein said liquid component and said bodies are of differing densities.

13. The method of claim 7 wherein said liquid component transitions from a liquid state to a solid state and back to a liquid state.

14. The method of claim 7 wherein said conforming comprises contacting a surface of the volume with an object that has a surface complementary to the desired contour.

15. The method of claim 7 wherein said mixture is contained within an elastic membrane, and the surface of the membrane has an impression formed in it by pushing an object against the membrane.

16. The method of claim 15 in which the degree of accuracy or irregularity on the surface of a stabilized mass of the mixture is dependent on the relationship between the fineness of the dimensions to be captured, a covering membrane's thickness and conformability, and the size and degree of regular packing order of a state-change mixture's solid bodies.

17. A method of making an object having a surface portion characterized by a desired shape comprising:
- providing reformable tooling that includes a volume of a mixture in a formable state, the mixture having solid and liquid components wherein
  - the solid component comprises a plurality of solid bodies, and
  - the liquid component fills the interstices between the bodies, and includes an excess amount beyond an amount that would be needed to fill the interstices when the
- bodies are packed, the excess amount of liquid thus allowing the mixture to be in the
- formable state;
  - causing a surface of the volume to assume a shape that is complementary to the desired shape;
  - extracting the excess amount of liquid to cause the mixture to transition from the formable state to a stable, force-resisting state where the bodies make nested, packed, interlocking or otherwise stable consolidated contact so that a portion of the volume has a stable surface portion that is complementary to the desired shape;
  - subsequently using the stable surface portion of the volume as a mold to impart the desired shape to the surface portion of material forming the object; and
  - subsequently reintroducing a sufficient volume of liquid to allow the mixture to transition from the stable, force-resisting state to the formable state.

18. The method of claim 17 wherein said causing a surface of the volume to assume the shape that is complementary to the desired shape comprises placing the mixture in a cavity mold that has a surface characterized by the desired shape.

19. The method of claim 17 wherein said causing a surface of the volume to assume the shape that is complementary to the desired shape comprises contacting a surface of the volume with an object that has a surface characterized by the desired shape.

20. The method of claim 17 wherein said excess amount of liquid is the minimum quantity to create a fluent condition by providing a predetermined clearance between the bodies, wherein the clearance permits the introduction of at least two simultaneous slip-planes between geometrically ordered bulk masses of the bodies at any point in the mixture.

21. The method of claim 17 wherein said liquid component and said bodies are of matching densities.

22. The method of claim 17 wherein said liquid component and said bodies are of differing densities.

* * * * *